United States Patent [19]
Diepers

[11] 4,240,869
[45] Dec. 23, 1980

[54] METHOD FOR MANUFACTURING A PHOTO CATHODE FOR ELECTRORADIOGRAPHIC AND ELECTROFLUOROSCOPIC APPARATUS

[75] Inventor: Heinrich Diepers, Höchstadt, Fed. Rep. of Germany

[73] Assignee: Siemens Aktiengesellschaft, Munich, Fed. Rep. of Germany

[21] Appl. No.: 962,928

[22] Filed: Nov. 22, 1978

[30] Foreign Application Priority Data

Dec. 7, 1977 [DE] Fed. Rep. of Germany ....... 2754526

[51] Int. Cl.[3] .......................... B44C 1/22; B23P 15/00; C03C 15/00; C23F 1/02

[52] U.S. Cl. .................................... 156/643; 156/150; 156/644; 156/652; 156/656; 156/661.1; 156/668; 204/24; 204/192 E; 204/192 EC; 252/79.1

[58] Field of Search ............ 204/164, 192 EC, 192 E, 204/15, 298, 24, 26, 27, 32 R; 156/644, 643, 646, 272, 650-652, 656, 654, 655, 659, 661, 150, 661.1, 695.1, 668; 427/97; 252/79.1; 430/321, 313, 314, 316; 219/121 P

[56] References Cited

U.S. PATENT DOCUMENTS

| | | | |
|---|---|---|---|
| 3,186,883 | 6/1965 | Frantzen | 156/644 |
| 3,202,094 | 8/1965 | Smallman | 101/128.2 |
| 3,816,196 | 6/1974 | LaCombe | 204/164 X |
| 3,975,252 | 8/1976 | Fraser et al. | 204/192 |
| 3,984,300 | 10/1976 | VanOmmeren | 204/192 E |
| 4,064,030 | 12/1977 | Nakai et al. | 204/192 E |
| 4,118,523 | 10/1978 | Bingham et al. | 156/644 X |

*Primary Examiner*—William A. Powell
*Attorney, Agent, or Firm*—Kenyon & Kenyon

[57] ABSTRACT

A method for manufacturing a photo cathode with a stacked arrangement of perforated double layer films each including two outer electrically conductive layers of a material with a high atomic number and an insulating layer disposed between them by first providing a highly insulating plastic film acting as the insulating layer, on both sides with an electrically conductive layer; subsequently providing each of these two electrically conductive layers so prepared with a hole pattern such that the holes of the two layers are opposite each other; and finally, removing those parts of the plastic film which close off the holes of the electrically conductive layers. This method avoids difficulties in the manufacture of highly insulating plastic layers.

2 Claims, 10 Drawing Figures

METHOD FOR MANUFACTURING A PHOTO CATHODE FOR ELECTRORADIOGRAPHIC AND ELECTROFLUOROSCOPIC APPARATUS

BACKGROUND OF THE INVENTION

This invention relates to photo cathodes in general and more particularly to an improved method of manufacturing a photo cathode for electroradiographic and electrofluoroscopic apparatus.

U.S. application Ser. No. 889,524 filed Mar. 23, 1978 and assigned to the same assignee as the present invention describes a photo cathode for electroradiographic and electrofluoroscopic apparatus which contains a stacked arrangement of perforated foils of a material with a high atomic number. The perforated foils of this photo cathode can advantageously be made as perforated double layer films with two outer, electrically conductive layers and an insulating layer disposed in between, a predetermined potential gradient being provided between the two outer layers.

Similar photo cathodes can be provided, especially for apparatus in the so-called low pressure ionography in medical technology (Phys. Med. Biol. 18 (1973), pages 695 to 703). In such equipment, the external X-ray photo effect of a solid-state photo cathode is used for generating electric charge carriers. The emitted photo electrons are subsequently multiplied in the gas space of a corresponding chamber by means of a Townsend discharge to such an extent that an electrostatic image that can be developed is produced on a paper or plastic foil. If an electroluminescent screen is used for collecting the charges instead of these foils, a process changing in time can also be displayed with this method in image sequences. Such a method is called electrofluoroscopy. A well known embodiment example of this is the X-ray image amplifier.

If a suitable filling gas, which may be at atmospheric pressure, is used in the chamber of such a photo cathode, amplification factors of $10^4$ can be obtained without difficulty. However, there is a great discrepancy between the depth of penetration of the X-rays and the range of the emitted photo eletrons. Due to this discrepancy, which is around 100:1, special measures must be taken for the photo cathodes to attain a quantum yield which will meet the requirements of medical technology regarding sensitivity and resolution. Quantum yield is understood here to be the number of photo electrons emitted per incident X-ray quantum. With the photo cathode mentioned at the outset with a stacked arrangement of perforated foils of a material with a high atomic number, relatively high absorption of the X-rays and thereby, correspondingly high quantum yield is now possible, since the quantum yield is essentially the product of the photo absorption coefficient and the range of the electrons and depends on the energy of the radiation and the atomic number of the cathode material. In addition, the quantum yield of the photo cathode mentioned at the outset is substantially higher than the quantum yield of a comparable solid, plane photo cathode because of the larger effective surface area due to the stacked arrangement of the perforated foils. The electron emission capacity of such a cathode increases proportionally to the larger surface as long as an attenuation of the X-rays in these structures is still of secondary importance.

The perforated double layer foils of such a photo cathode can be manufactured, according to Ser. No. 889,524, by first providing the webs on a simple perforated foil with an insulating layer on one side and finally depositing an electrically conductive material on the parts of the insulating layer which cover up the webs. The insulating layers must be as free as possible of disturbances which could lead to a reduction of the dielectric strength of the insulating layer. In the proposed procedure, the effort to achieve this is relatively great.

It is therefore an object of the present invention to describe another method by which perforated double layer foils for a photo cathode of the type mentioned at the outset can be manufactured in a relatively simple manner.

SUMMARY OF THE INVENTION

According to the present invention, this problem is solved by first using a highly insulating plastic film as the insulating layer and providing it with an electrically conductive layer on both sides; then providing each of the electrically conductive layers so produced with a hole pattern such that the holes in the two layers are opposite each other; and by finally removing those parts of the plastic film which cover up the holes in the electrically conductive layers. A highly insulating plastic film is understood to be a film with a dielectric strength of at least $10^4$ V/cm.

The advantages of this method are, in particular, that commerically produced plastic films which are highly insulating, i.e., which contain no disturbances which lead to a reduction of the dielectric strength of the film can be used.

According to a further development of the method, the hole pattern can advantageously be etched into the electrically conductive layer by means of a suitable hole mask placed thereon. The hole mask is preferably applied to the respective electrically conductive layer by a photoresist technique. With this method, the desired hole pattern is produced photoelectrically in a photoresist varnish applied to the electrically conductive layer. Subsequently, the hole pattern can then advantageously be etched into the electrically conductive layer by sputter etching in an argon plasma. Burning up of the hole mask of the photoresist can thus be avoided. Finally, the photoresist is removed again in a manner known per se without danger of adversely affecting the electrically conductive layers or the insulating film.

Those parts of the plastic film which close off the blind holes in the electrically conductive layers at the bottom, can advantageously be etched out. The etching is preferably accomplished by plasma etching in an oxygen or an argon-oxygen plasma, since in such a sputter process the share of sputtered film material is small; the removal takes place essentially by burning up in the oxygen plasma.

DETAILED DESCRIPTION OF THE INVENTION

A photo cathode made by the method according to the present invention for electroradiographic and electrofluoroscopic apparatus in medical technology is to contain a multiplicity of perforated double layer foils, which are arranged in a stack and are provided on their respective outer flat sides with an electrically conductive layer of a material with a high atomic number. Individual steps for preparing perforated double layer foils suitable for this purpose are indicated in the following figures.

Figure 1:
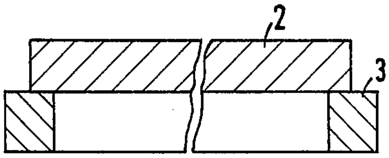
FIGS. 1 to 10 are views illustrating the steps of the method of the present invention.

FIG. 1 shows a cross section through a self-supporting insulating foil 2, i.e., one which does not require a separate support structure, and the thickness of which is between about 0.1 and several μm. This foil is stretched over a frame 3. Such foils are commercially available (for instance from Union Carbide under the trade name Parylene). They can also be prepared by a known method on suitable substrates, then separated therefrom and stretched out in the desired manner. The foil material is at least approximately free of disturbing occlusions which lead to a reduction of the dielectric strength. The dielectric strength should be at least $10^4$ V/cm and perferably more than $10^5$ V/cm. Films of the known material, for instance, have a dielectric strength of 2 to $3 \times 10^6$ V/cm with a layer thickness of 25 μm. The resistivity of this film is about $6 \times 10^{16}$ ohm-cm.

Figure 2:
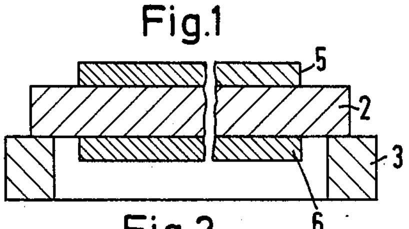

Such a film of insulation 2 is now provided on both sides, according to FIG. 2, with a thin layer, for instance, a few μm thick of a material with a high atomic number. The respective layers 5 and 6 can consist of gold, for instance, and are advantageously vapor-deposited or sputtered onto the exposed upper and lower flat side of the film 2, i.e., precipitated in a cathode sputtering facility. To improve the adhesion between the film and the vapor-deposited or sputtered-on layer, brief plasma etching of the film surfaces performed beforehand in an oxygen or oxygen-argon plasma is advantageous.

Figure 3:
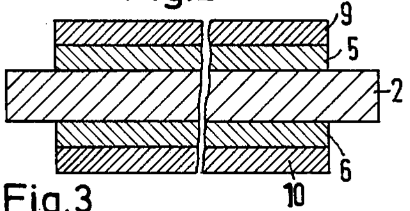

In accordance with FIG. 3, the two gold layers 5 and 6 are each then coated with a layer 9 and 10, respectively, of a, for instance, positive photoresist varnish. The layers of varnish can be applied to the gold layers, for instance by centrifuging.

Figure 4:
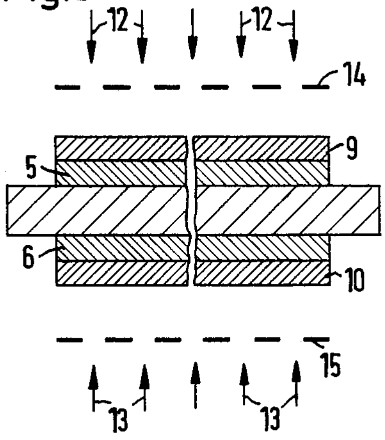

According to FIG. 4, parts of the two photoresist varnish layers 9 and 10 are thereupon exposed from their flat sides to UV radiation indicated by arrows 12 and 13. The parts of the varnish layers which are not to be exposed are shielded against the UV radiation by masks 14 and 15 which are not covered up by the mask are therefore exposed.

Figure 5:
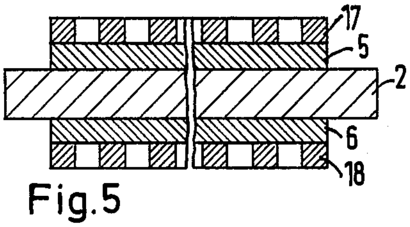
Figure 6:
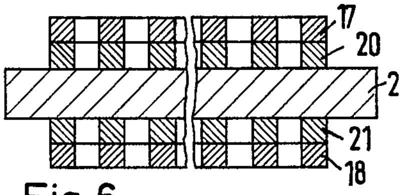

After developing and dissolving these exposed varnish layer parts, a corresponding hole mask 17 and 18, respectively, of photoresist then remains, according to FIG. 5, on the upper and lower side of the gold layers 5 and 6. Subsequently, the gold layers 5 and 6 are etched at the points not covered by the photoresist masks 17 and 18, for instance, by sputter etching in an argon plasma. The photoresist serves as a mask. In this process step, a low partial oxygen pressure of preferably less than $10^{-6}$ Torr is maintained in order to avoid burning up the photoresist. At the points not covered by the photoresist, the gold can optionally also be dissolved by chemical etching. Thus, the perforated gold films 20 and 21 shown in FIG. 6 are obtained on both sides of the insulating film with a hole structure which corresponds to that of the photoresist hole masks 17 and 18.

Figure 7:
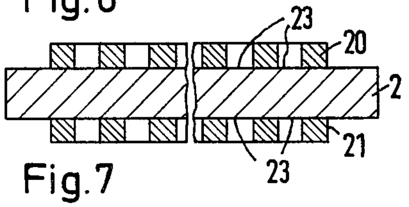
Figure 8:
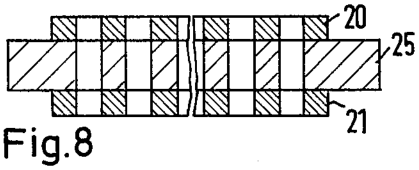

The photoresist varnish layers 17 and 18 still present on these gold films 20 and 21 are subsequently separated off chemically in a manner known per se, in accordance with FIG. 7. In general, there is no danger of a reaction between the solvents suitable for the photoresist and the material of the insulating film 2 and any reaction is also of no significance. For, the parts 23 of the insulating film 2 which are not covered by the so produced perforated gold films 20 and 21 are subsequently dissolved, for instance, by etching, and one obtains the insulating film shown in FIG. 8 with a corresponding hole structure. The perforated film so produced is designated 25 in the figure. Dissolving the parts 23 of the film 2 by chemical means can present difficulties because of the high resistance of the film material. In that case, sputter etching in an oxygen or in an argon-oxygen plasma is provided to advantage. Preferably, plasma etching is used in which burning takes place in an oxygen plasma of low power density and therefore, etching of the film portions to be removed by means of the active oxygen generated by the plasma. The share of sputtered film material is small here. Detrimental thermal stress of the perforated gold film layers 20 and 21, which could lead to warping, is avoided. It is likewise prevented that, due to the substantially higher sputter rate of gold as compared to the material of the insulating film, gold atoms could condense on that material.

Figure 9:
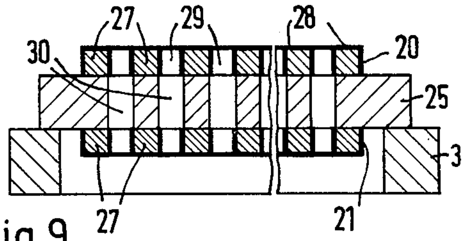
Figure 10:
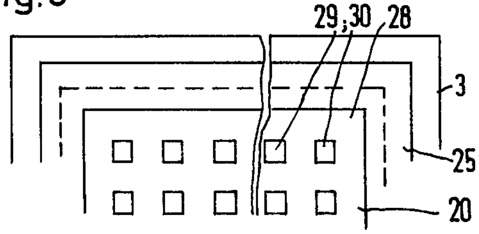

If the desired layer thickness of the metallic cover layers 20 and 21 cannot be obtained right away, these layers can also be reinforced later by electroplating. In FIGS. 9 and 10, part of a corresponding perforated double layer foil is shown as a cross section and a top view, respectively. The parts deposited by electroplating on the individual webs 27 of the perforated gold layer films 20 and 21 are indicated in the figure by heavier lines designated with 28. By reinforcing these webs, the cross section area of the holes 29 formed between them is reduced accordingly in comparison with the holes 30 in the perforated film 25 of the insulating material.

In some cases, gold layers of greater thickness, say, more than 1 μm may be desired. Such layer thickness can be of advantage particularly in perforated double layer foils of large area, since then the foils are mechanically stronger and have less tendency to sag. In these cases it is advantageous to provide an additional metallic mask between the respective gold layer and the corresponding mask of the photoresist layer. In this manner, the mask of the photoresist layer being taken down completely in the sputter process for etching away the intended parts sooner than the gold layer parts to be sputtered out can be prevented. Titanium is particularly well suited as the mask material for these intermediate masks. This material can be applied to the gold layers for instance by vapor deposition or sputtering. In accordance with the described method for etching the gold layers, a mask of the photoresist varnish with the desired hole pattern is applied to the titanium layers for preparing the intermediate masks. This hole pattern is transferred subsequently to the titanium layer by means of sputter etching. For this purpose, an argon plasma with a partial oxygen pressure as low as possible, which is advantageously lower than $10^{-6}$ Torr, is provided. The thickness of the titanium layer must be chosen such that the photoresist mask lasts at least long enough for the titanium hole pattern to be fully developed, i.e., the titanium layer in the holes intended is completely removed. Thereupon, some oxygen is added to the argon plasma, for instance, without interruption of the continuing sputter etching process, until a partial pressure of, for instance, 10−4 Torr is present. This oxidizes the titanium mask superficially. Since titanium oxide (TiO) has a lower sputter rate than titanium or gold, the gold layer can be etched out completely in the holes of the hole mask in the further course of the sputter etching of the gold layer; this can be done even if only a thin titanium layer was applied. Residue of the photoresist layer is completely removed by burning it off in the process. In the process step following thereon of the etching the insulating film at the hole locations, no difficulties are encountered, since an oxygen-containing plasma can then be provided anyhow.

It may be possible that after the complete etching-out of the hole structure in the gold layer, parts of the titanium mask are still present. Then, the sputtering process can be continued until the titanium layer residue is completely removed, since thereby no disadvantages accrue for the insulating film exposed in the holes, provided a low plasma power density is adjusted. Detrimental thermal stresses of the insulating film can thus be avoided.

In the method illustrated in FIGS. 1 to 10, it was assumed that the masking process and also the etching processes are carried out simultaneously on both sides of the insulating film. However, the individual processes can equally well also perform sequentially, or one can mask and etch from one side, the etched layer serving as a mask for the following process step.

What is claimed is:

1. A method for manufacturing perforated double layer foils having two outer electrically conductive layers of a material with a high atomic number and an insulating layer disposed between said two outer layers, for use as a photocathode for electroradiographic and electrofluoroscopic apparatus comprising:

(a) first briefly etching a highly insulating plastic film with a dielectric strength of at least $10^4$ V/cm in an oxygen or argon-oxygen plasma;

(b) then vapor-depositing or sputtering an electrically conductive layer on both sides of the plastic film;

(c) subsequently vapor-depositing or sputtering a metallic intermediate layer of titanium onto each of said electrically conductive layers;

(d) then applying hole masks to the respective metallic intermediate layers, using a photoresist technique, such that the holes of the masks are opposite each other;

(e) then etching a hole pattern into each of the metallic intermediate layers, using said hole masks which have been applied to the intermediate layers, by means of sputter etching in an argon plasma with a partial oxygen pressure of less than $10^{-6}$ Torr;

(f) subsequently etching the hole pattern into the electrically conducting layers, using said hole masks applied to the metallic intermediate layer, by means of sputter etching in an argon plasma with a partial oxygen pressure higher than said pressure of $10^{-6}$ Torr; and (g) finally removing those parts of the plastic film which close off the holes of the electrically conductive layers, whereby the masks of the photoresist material and of the intermediate layers are also removed.

2. The method according to claim 1 and further including reinforcing the perforated double layer foils by electroplating.

* * * * *